United States Patent [19]

Retallick

[11] 4,190,559
[45] Feb. 26, 1980

[54] METAL CATALYST SUPPORT HAVING RECTANGULAR CROSS-SECTION

[75] Inventor: William B. Retallick, West Chester, Pa.

[73] Assignee: Oxy-Catalyst, Inc., West Chester, Pa.

[21] Appl. No.: 951,980

[22] Filed: Oct. 13, 1978

[51] Int. Cl.² ............................................... B01J 35/02
[52] U.S. Cl. ............................... 252/477 R; 428/588; 428/589; 428/590; 428/596; 428/603
[58] Field of Search .................... 252/477 R; 428/588, 428/589, 590, 596, 603

[56] References Cited

U.S. PATENT DOCUMENTS

| | | | |
|---|---|---|---|
| 3,528,783 | 9/1970 | Haselden | 252/477 R |
| 3,944,505 | 3/1976 | LaCroix | 252/477 R |
| 3,993,600 | 11/1976 | Hunter | 252/477 R |
| 4,098,722 | 7/1978 | Cairns et al. | 252/477 R |

*Primary Examiner*—W. J. Shine
*Attorney, Agent, or Firm*—Paul & Paul

[57] ABSTRACT

A catalyst support comprises a stack of metal strips, said strips being coated with a catalyst material. Indentations in the strips maintain uniform spacing between the strips, so that gas can flow between the strips. The indentations are spaced so that the indentations in adjacent strips cannot coincide and nest together, so that adjacent strips cannot collapse together.

9 Claims, 2 Drawing Figures

METAL CATALYST SUPPORT HAVING RECTANGULAR CROSS-SECTION

BACKGROUND OF THE INVENTION

This invention relates to metal catalyst supports. Such supports comprise metal "skeletons" which are coated with a catalyst, and through which gas is made to travel. The catalyst support must therefore allow the gas to come into contact with the catalyst, but must also allow the gas to flow through the support unimpeded.

My copending Application Ser. No. 894,180 discloses a metal catalyst support in the form of a spiral formed by winding a single strip of metal upon itself, wherein the spacing between layers of the spiral is uniform. The uniform spacing in the spiral is maintained by indentations similar to those in the present flat strips, to be described below. In both types of catalyst supports, it is necessary to prevent the indentations in successive layers or strips from nesting together. In the spiral, this coincidence is prevented by spacing the indentations along the spiral in a pattern that varies, and is not repeated in any layer of the spiral.

A spirally wound metal catalyst support has a cylindrical shape and a circular face. The cylindrical shape is best for catalytic combustors and catalytic mufflers. But if one needs to treat catalytically the flue gas from an electric power plant, the flow of gas is enormous, and so is the cross-sectional area of the catalyst. The large cross section can be filled completely with rectangles, but not with circles. Hence, the preferred metal catalyst support for treating flue gas is a stack of strips having a rectangular face instead of a circular face. Individual stacks of strips, of rectangular shape, are nested together like the panes in a window, as will be described below.

SUMMARY OF THE INVENTION

The present invention solves the problem, described above, in the use of metal catalyst supports, by the use of a plurality of metal strips having indentations. The indentations keep the strips a uniform distance apart, permitting gas to flow between strips. Adjacent strips are rotated with respect to each other so that the pattern of indentations on one strip cannot match the pattern of indentations on the adjoining strips.

It is a primary object of the present invention to provide a metal catalyst support having a plurality of parallel strips.

It is a further object of this invention to provide a catalyst support as described above wherein adjacent strips do not collapse together.

It is a further object of this invention to provide a catalyst support as described above, wherein substantially all of a given cross-sectional area can be filled with catalyst supports.

Other objects and advantages of this invention will be apparent to those skilled in the art, from a reading of the following Brief Description of the Drawings, the Detailed Description of the Invention, and the appended claims.

DETAILED DESCRIPTION OF THE INVENTION

The present invention discloses a metal catalyst support comprising a plurality of strips having indentations. The strips are coated with a catalyst, which will interact with gas passing through the catalyst support. The strips have indentations which hold the strips apart, and prevent the strips from collapsing. Thus, gas may flow freely through the stack of strips.

Figure 1:
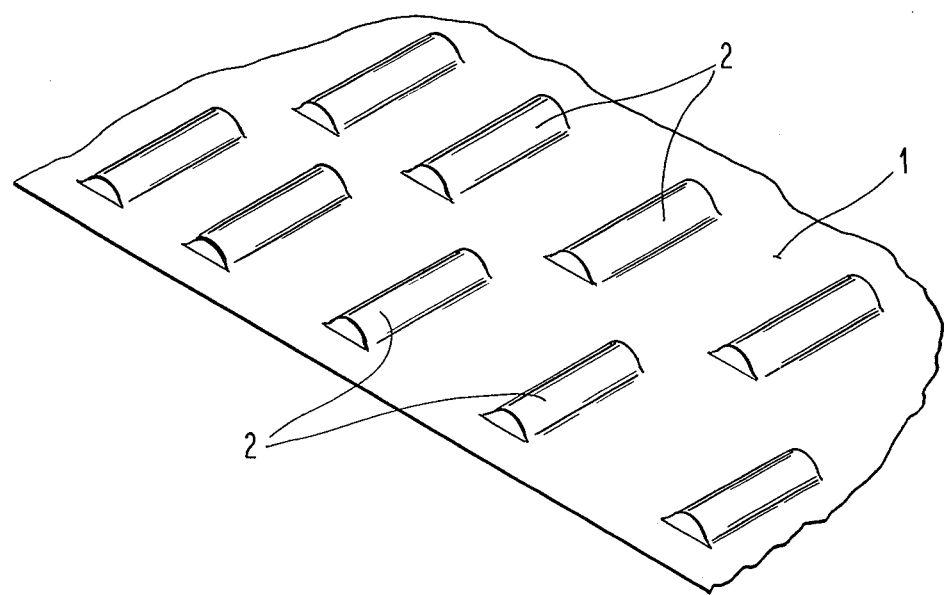
FIG. 1 is a perspective view of a fragmentary portion of a single strip showing first and second runs of indentations of uniform height.

FIG. 1 shows a fragmentary perspective view of metal strip 1, showing indentations 2 arranged in rows. The shape of the indentations 2 must be chosen so as to maintain uniform spacing between the strips. It is clear from FIG. 2 that the indentations 2 of the strips 1 are of uniform height. It is also clear from FIG. 2 that the spacing between adjacent strips 1 is equal to the height of the indentations 2. Indentations 2 must be sufficiently rigid to withstand collapse when the strips are compacted together to form a stack, and they must not obstruct the flow of gas through the stack. Indentations having the shape shown in FIG. 1 satisfy this requirement. The raised surface of the indentation is cylindrical, which means that the surface is generated by a straight line that remains parallel to its original position as it generates the surface. The ends of the indentations are open. The indentations are aligned perpendicular to the length of the strips, and therefore perpendicular to the face of the stack. The indentations present only the edge of the indented metal to the gas flowing through the stack, as illustrated in FIG. 2, which shows a plurality of strips, as in FIG. 1, stacked together.

Figure 2:
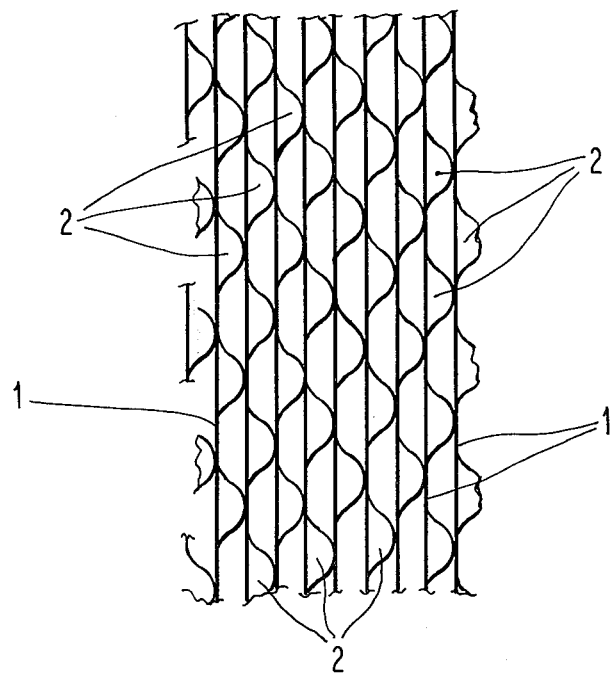
FIG. 2 shows, in front elevation, the face of a stack formed by stacking the strips in FIG. 1. Only one row of indentations is shown, to simplify FIG. 2.

The indentations 2, in FIG. 2, must be spaced so that they do not nest together. One way to form the indentations is to pass a continuous strip between a pair of die wheels, and then to cut the indented strip into lengths equal to the side of the stack. If the circumference of the die wheel is at least as great as the side of the stack, and if the pattern of spacing is not repeated around the circumference of the die wheels, the indentations in adjacent strips cannot nest together. My copending application Ser. No. 894,180 discloses means for generating a non-repeating pattern of spacing on the die wheels.

The present invention, however, discloses a simpler way to prevent the flat strips 1 from nesting together, that avoids the expense of generating a non-repeating pattern of spacing. The rows of indentations 2 can be spaced asymmetrically about a line running lengthwise down the center of the strip. Alternate strips in the stack are rotated 180 degrees about an axis perpendicular to the plane of the strip. Now the indentations cannot coincide and nest together, no matter what the spacing of the indentations within the rows.

There is still another way of generating a non-repeating pattern of indentations. The indentations may be disposed along an undulating line on the strip, with all indentations being parallel to each other. For example, the indentations could be arranged along a sine curve. In this configuration, the spacing between adjacent indentations could be uniform or non-uniform, and the strips still would not nest together. Such an arrangement of indentations might be generated by wiggling a blank strip from side to side as the strip is passed through an indentation-forming apparatus.

Observe that, in the embodiment shown in FIG. 2, the strips are vertically disposed. This arrangement permits dirt which may accumulate in the catalyst support to fall by gravity, so as not to impede the flow of gas through the support. A horizontal arrangement is also possible, but does not have this extra advantage of the vertical stack.

Although the title of this invention refers to the rectangular cross-section of the catalyst support it is understood that the cross-section need not always be rectangular. It is possible, for example, to stack the strips so as to form a triangular, or even hexagonal cross-section, all within the scope of this invention. Thus this invention discloses a catalyst support which can be adapted to fill a space of any given type of cross-section, without having to leave any valuable space unused.

It is clear that the objects of this invention are met by the above disclosure. It is understood that other modifications of the invention which may be made are included within the scope of the claims set forth below.

What is claimed is:

1. A metal catalyst support comprising:
   a. a stack of metal strips;
   b. said strips having indentations of uniform height, wherein the spacing between said strips is equal to said height; and
   c. wherein said indentations are spaced along said strips in a varying, non-repetitive pattern, wherein the indentations in adjacent strips cannot coincide and nest together.

2. The catalyst support of claim 1, wherein said indentations have a cylindrical surface and open ends.

3. The catalyst support of claim 2, wherein said indentations are aligned perpendicular to the length of said strips and perpendicular to the face of the stack, whereby said indentations present only the edge of the indented metal to gas flowing through the stack.

4. The catalyst support of claim 3, wherein said strips are coated with a catalyst.

5. A metal catalyst support comprising:
   a. a stack of metal strips;
   b. said strips having indentations of uniform height, wherein the spacing between said strips is equal to said height;
   c. said indentations being arranged in rows along the length of said strips;
   d. said rows being spaced asymmetrically about the center line of each of said strips; and
   e. wherein alternate strips in said stack are rotated 180 degrees about an axis perpendicular to the plane of said strip.

6. The catalyst support of claim 5, wherein said indentations have a cylindrical surface and open ends.

7. The catalyst support of claim 6, wherein said indentations are aligned perpendicular to the length of said strips and perpendicular to the face of said stack, whereby said indentations present only the edge of the indented metal to gas flowing through said stack.

8. The catalyst support of claim 7, wherein said strips are coated with a catalyst.

9. The catalyst support of claim 5, wherein the plane of each of said strips is perpendicular to the horizontal.

* * * * *